United States Patent
Letzer

3,761,172
Sept. 25, 1973

[54] COLOR ANALYZING PHOTOGRAPHIC PRINTER

[75] Inventor: Edward K. Letzer, Rochester, N.Y.

[73] Assignee: Eastman Kodak Company, Rochester, N.Y.

[22] Filed: Mar. 29, 1972

[21] Appl. No.: 239,061

[52] U.S. Cl. .................. 355/3, 355/37, 350/160 LC
[51] Int. Cl. ............................................. G03g 15/14
[58] Field of Search .................... 355/32, 35, 37, 38, 355/3 R, 3 P; 95/53 EC; 350/160 LC

[56] References Cited
UNITED STATES PATENTS

| | | | |
|---|---|---|---|
| 3,085,469 | 4/1963 | Carlson | 355/37 |
| 3,666,881 | 5/1972 | Stein | 350/160 LC |

*Primary Examiner*—Samuel S. Matthews
*Assistant Examiner*—Michael Harris
*Attorney*—W. H. J. Kline

[57] ABSTRACT

A positive color representation of pictorial information contained on a photographic color negative is produced by a method and apparatus for projecting red, blue and green light through a photographic color negative positioned in a projection station, separating the red, blue and green light projected through the photographic color negative, forming and temporarily storing positive images of the separated red, blue and green color separation images, illuminating the respective stored positive images with red, blue and green light, respectively, and projecting the stored red, blue and green color positive images in mutual superimposition upon a viewing screen, whereby a positive representation of the pictorial information on the color negative is produced on the viewing screen. Each color positive image may be formed in a respective electro-optical color separation image forming, photoconductor-liquid crystal, sandwich structure by the application of a first voltage potential across the photoconductor-liquid crystal sandwich structure. The positive color representation of the pictorial information may be analyzed for color balance and intensity, and, as a result of each analysis, the relative intensities of the red, blue and green light projected through the color negative may be adjusted or varied. The temporarily stored positive images may be erased by application of a second voltage potential across the first, second and third photoconductor-liquid crystal sandwich structures.

10 Claims, 4 Drawing Figures

PATENTED SEP 25 1973 3,761,172

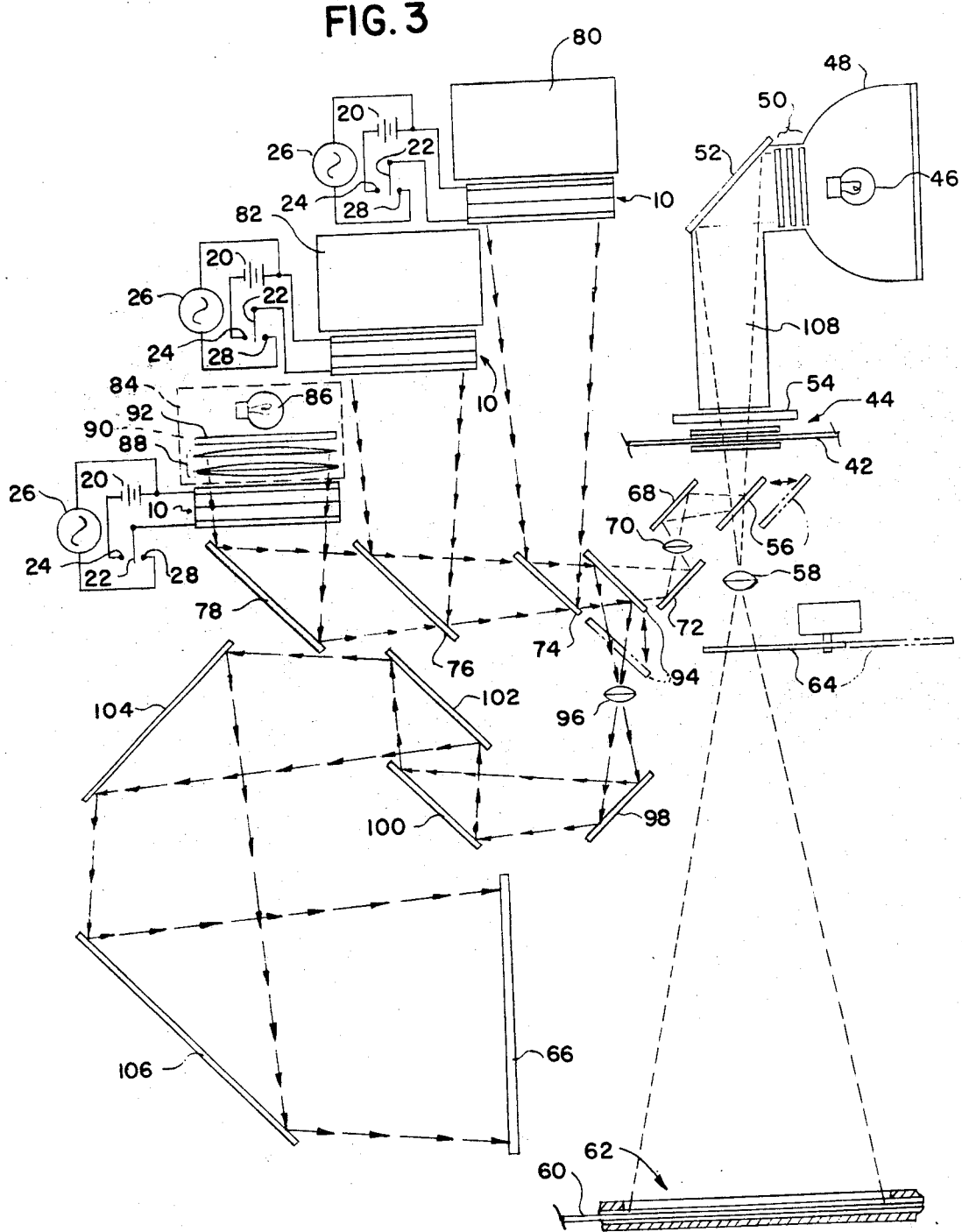

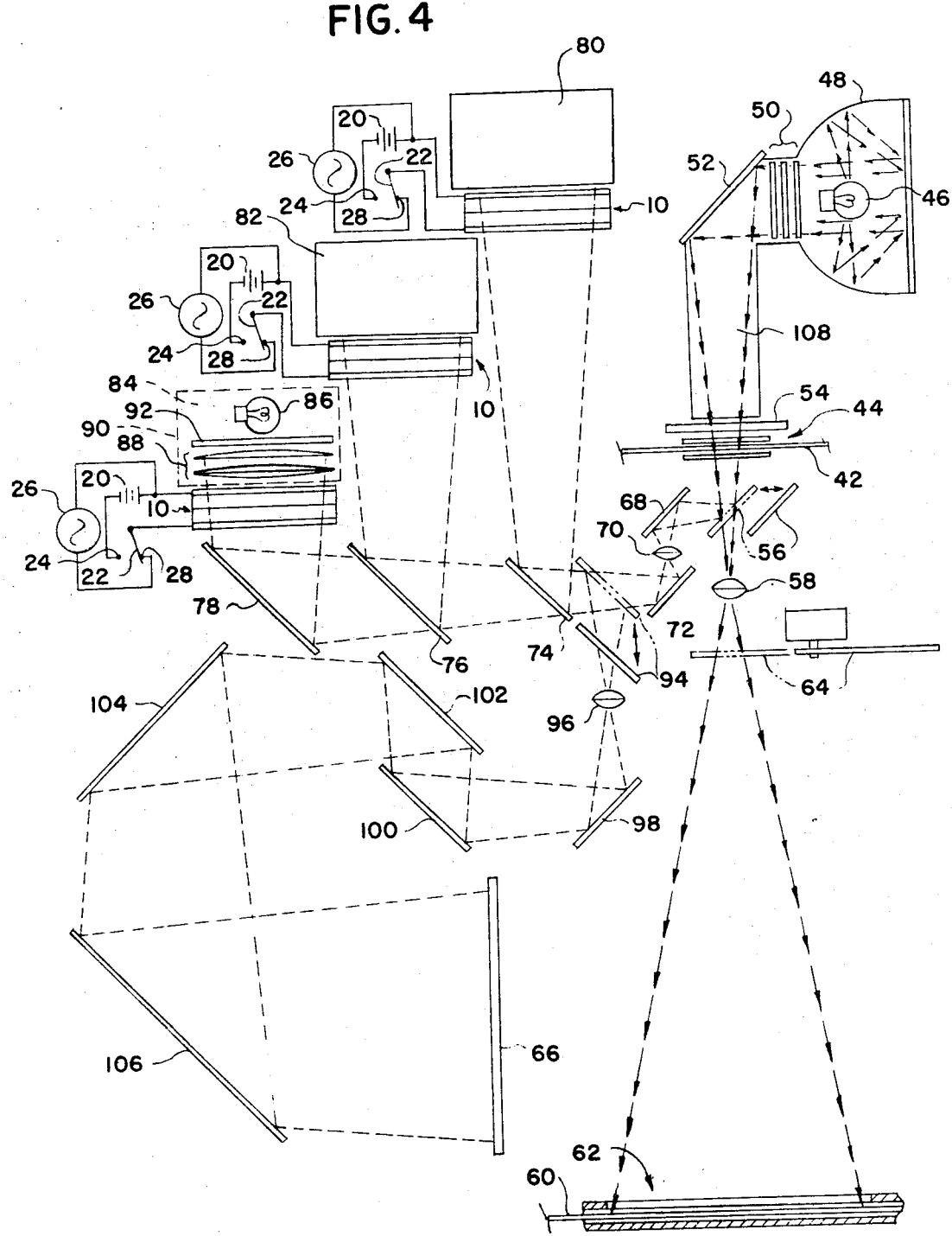

3,761,172

COLOR ANALYZING PHOTOGRAPHIC PRINTER

CROSS REFERENCE TO RELATED APPLICATIONS

Reference is made to commonly assigned copending U.S. Application Ser. No. 81,960 filed Oct. 19, 1970, now abandoned in favor of Ser. No. 262,854, filed June 14, 1972, as a continuation-in-part therefor, entitled MASKING PRINTER, and to commonly assigned copending U.S. Application Ser. No. 239,152, filed on even date herewith, and entitled COLOR PRINTER, both to Edward K. Letzer, and to commonly assigned copending U.S. Application Ser. No. 151,342, filed June 9, 1971, now abandoned in favor of continuation-in-part Ser. No. 279,572, filed Aug. 1, 1972, entitled MICROFILM CAMERA to John E. Morse.

BACKGROUND OF THE INVENTION

1. Field of the Invention

In accordance with this invention, photographic color printing method and apparatus are provided for analyzing and printing the pictorial information contained on a photographic color negative.

2. Description of the Prior Art

Photographic color negative analyzers that are capable of providing a positive color representation, with adjustable color balance, of a conventional photographic color negative are well known in the prior art. Such a prior art color negative analyzer is disclosed in U.S. Pat. No. 3,351,707 to Alex W. Dreyfoos, Jr., et al, and entitled ELECTRONIC COLOR VIEWER, and it provides a clear positive color picture representation with adjustable color balance, directly from a photographic original of the pictorial information thereon. This negative analyzer constitutes a closed circuit, sequential field type television system that converts optical information to electrical information and then reconverts the electrical information back to optical information to provide a positive color representation of the photographic original.

The above described negative analyzer is used with a photographic color printer for providing a positive color representation of a color negative and for determining the color correction factors necessary to provide a pleasing color balance in a photographic print made on the printer from the color negative. The negative analyzer employs a number of moving parts including rotating field sequential color filters and a rotating timing disk and, as a consequence, is very complex and expensive. Furthermore, the photographic color printer required for use with the negative analyzer is also very complex and expensive.

SUMMARY OF THE INVENTION

Accordingly, it is an object of the present invention to devise a printing method and apparatus for simply and inexpensively producing a positive color representation of pictorial information contained on a photographic color negative, color balancing the positive color representation, and producing a properly color balanced photographic print from the photographic color original.

It is a further object of the present invention to provide a method and apparatus for producing a positive color representation of pictorial information contained on a photographic color original.

It is also an object of the present invention to provide a photographic color analyzing printer incorporating a method and apparatus for producing a positive color representation of pictorial information contained on a photographic color original.

Furthermore, it is an object of the present invention to provide a photographic color printing method and apparatus for color balancing the pictorial information contained on a photographic color negative and for producing a color balanced print from the photographic color negative.

It is a still further object of the present invention to provide a photographic color printing method and apparatus for producing a positive color representation of pictorial information contained on a photographic color negative through the use of electro-optical temporary image forming devices comprising liquid crystal and photoconductive materials and for producing a color balanced photographic print of pictorial information contained on the photographic color negative.

In accordance with these and other objects of the present invention, photographic printing methods and apparatus are disclosed herein in which a positive color representation of pictorial information contained on a color negative is produced by projecting radiation of at least first and second wavelengths or light containing the three primary colors, red, green and blue, through a photographic original, e.g., a color negative, positioned in a projection station, separating the red, green and blue light transmitted by the color negative into negative red, green and blue color separation images of the pictorial information on the color negative, forming and temporarily storing positive color separation images of said negative red, green and blue color separation images, respectively, and projecting light containing the three primary colors, red, green and blue respectively through said positive color separation images in mutual superimposition onto a viewing screen, whereby positive representation of the pictorial information on the color negative is produced on the viewing screen. Color imbalances and brightness in the positive color representation produced on the viewing screen are observed and the relative intensities of the red, green and blue light projected through the color negative are varied to correct for such imbalances. The temporarily stored positive color separation images may then be erased, and the above steps may be repeated to check the accuracy of the adjustment made to the relative intensities of the red, green and blue light projected through the color negative. After a pleasing, color balanced, positive color representation of the pictorial information on the photographic negative is observed on the viewing screen, the red, green and blue light projected through the color photographic negative positioned in the projection station is directed onto photosensitive photographic print material, whereby a color balanced photographic print may be produced after the photosensitive color print material is developed.

More particularly, the red, green and blue color positive images may be formed in electro-optical image forming devices comprising photoconductor-liquid crystal sandwich structures of the type having the capacity to store an image at least temporarily in response to an image projected thereon and the concurrent application of a first, d.c., voltage potential across the photoconductor-liquid crystal sandwich structures.

The positive images may be erased from the photoconductor-liquid crystal sandwich structures by application of a second, a.c., voltage potential across the photoconductor-liquid crystal sandwich structures.

Among the advantages of the photographic color analyzing printer method and apparatus of the present invention is the advantage that the positive color representation of the pictorial information may be produced without the use of expensive electronic components and mechanical moving parts. The temporary image forming devices described above may be reused indefinitely after each erasure of the positive images formed thereon, and the time that it takes to form and erase the positive images is extremely short.

Furthermore, the method and apparatus for producing a positive color representation of pictorial information on the photographic color negative may be inexpensively incorporated into the structure of existing photographic printers.

Additional advantages of this invention will be readily apparent from the description which follows, taken in conjunction with the accompanying drawings.

BRIEF DESCRIPTION OF THE DRAWINGS

FIG. 3 is a side elevation of the color analyzing printer of FIG. 2 operative in a second mode for producing a positive color representation of the pictorial information contained on the color negative on a viewing screen by projecting in three colors the temporary images in the temporary image forming devices onto the viewing screen; and FIG. 4 is a side elevation of the color analyzing printer of FIGS. 2 and 3 operative in a third mode for printing the pictorial information contained on the color negative on photosensitive photographic print material.

DESCRIPTION OF THE PREFERRED EMBODIMENT

Figure 1:
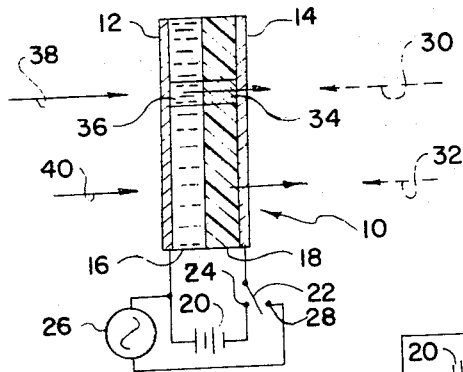
FIG. 1 is a view of a temporary image forming device comprising an enlarged section through a photoconductor-liquid crystal sandwich structure and an associated electrical circuit.

As stated hereinbefore, my invention involves a method and apparatus for producing a positive color representation of pictorial information contained on a photographic color original through the use of electro-optical temporary image forming and storing devices comprising photoconductive and liquid crystal materials and for producing a color balanced photographic print from the original. Before describing in detail the particular color analyzing printer constituting the preferred embodiment of the invention shown in FIGS. 2 to 4, a description of the temporary image forming device of FIG. 1 is in order. In FIG. 1 there is shown an enlarged cross-section through a photoconductor-liquid crystal sandwich structure 10 and associated electrical circuit constituting a temporary image forming device of the same type shown and described in the aforementioned commonly assigned copending U.S. Application and employed in the analyzing color printer of the present invention shown in FIGS. 2 to 4. The term liquid crystal was first used by a scientist named O. Lehmann to identify certain substances that pass through a state or condition over a given temperature range between a solid crystalline state and an isotropic liquid state wherein they display rheological properties similar to that of fluids, but have optical properties similar to that of the crystalline state. Such substances which exhibit these properties may be considered as being in fourth state of matter known as the mesomorphic state or mesophase since it is a state or phase intermediate that of the anisotropic crystal and that of the isotropic liquid.

There are three distinct mesomorphic states or forms, namely, the smectic mesophase, the nematic mesophase, and the cholesteric mesophase. A nematic liquid crystal is essentially transparent, and therefore transmits light, but when placed in a d.c. electric field the molecules of some of these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July, 1968 in an article entitled: "Dynamic Scattering: A New Electro-Optical Effect in Certain Classes of Nematic Liquid Crystals", by Heilmeier, Zanoni and Barton at pp. 1162–1171.

The optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems", by Heilmeier and Goldmacher at pp. 132 and 133, in which the authors describe how a mixture of nematic and cholesteric mesomorphic materials serve as an optical storage under a d.c. or low frequency a.c. electric field, which changes the initially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz. It is this type of electro-optical action of liquid crystals that is advantageously employed in the temporary image forming device used in my invention.

Referring now to FIG. 1 in greater detail, there is shown in cross section a photoconductor-liquid crystal sandwich structure 10 which comprises spaced, first and second, transparent electrodes 12 and 14, which may be made of NESA glass, and which have spaced between them a liquid crystal layer 16 and a photoconductive layer 18 in contiguous relationship with the first and second transparent electrodes 12 and 14, respectively. A first, d.c., voltage potential may be applied across the first and second transparent electrodes 12 and 14 by means of a d.c. voltage potential source 20 through the closure of the switch 22 (shown in FIG. 1 in an open, neutral position) upon a first terminal 24. Alternately, a second, a.c., voltage potential may be applied across the first and second transparency electrodes 12 and 14 by means of a.c. potential source 26 when the switch 22 is closed upon a second terminal 28.

Both the liquid crystal layer 16 and the photoconductive layer 18 are normally transparent, and when the photoconductive layer 18 is exposed to little or no light, it is electrically insulating, so that the potential drop between first and second transparency electrodes 12 and 14 is substantially entirely across photoconductive layer 18, and very little potential drop exists across liquid crystal layer 16. However, upon exposure to light, the photoconductive layer 18 becomes more conductive so that a greater portion of the potential drop is across liquid crystal 16. As stated hereinbefore, liquid crystals particularly those of the nematic type of a combination of nematic and cholesteric materials are normally transparent, but can be made to diffuse light by applying a voltage potential across them. Therefore, as the photoconductive layer 18 becomes more conductive, liquid crystal layer 16 becomes more diffusive and therefore more opaque to transmitted light.

This and other electro-optical properties of the photoconductor-liquid crystal sandwich structure 10 described hereinafter are advantageously employed in the color printer of the present invention in first, second and third temporary image forming devices to form temporary images of the pictorial information or other original image on a photographic color negative. The temporary images constitute, when viewed specularly with red, green and blue light, respectively, first, second and third respective positive color images of the photographic color negative.

To form a temporary image in liquid crystal layer 16, switch 22 is closed upon the first terminal 24 to connect the first, d.c., voltage potential source 20 to the first and second transparent electrodes 12 and 14 and across the liquid crystal layer 16 and photoconductive layer 18. At the same time, an original image is projected in the direction of arrows 30 and 32 upon the photoconductor-liquid crystal sandwich structure 10 to render photoconductive layer 18 selectively conductive in the pattern corresponding to the intensity of light transmitted by the original image. Thus, areas of the photoconductive layer 18, such as area 34, which receives a significant amount of light in the direction of arrow 30 from the original image will become conductive, so that a higher potential drop exists across the corresponding area 36 of the liquid crystal 16 than the remaining areas of the liquid crystal layer 16, causing area 36 to become light opaque or light diffusing. The remaining areas of the photoconductive layer 18 which receive little or no light, such as indicated by arrow 32, remain substantially insulative and do not change the light transmitting characteristics of the corresponding areas of the liquid crystal layer 16. Thus, the liquid crystal layer 16 has formed thereon a temporary image, when viewed in the direction of arrows 30 and 32, which tends to diffuse or scatter specular light transmitted therethrough in the path of the arrow 38 in the area 36 and tends to transmit light directed therethrough in the path of the arrow 40 and the remaining areas of the liquid crystal layer 16. The temporary image of the original image formed in the photoconductor-liquid crystal sandwich structure 10 of FIG. 1 is, therefore, a negative image, in the photographic sense of a positive original image, or a positive image of a negative original image, since light transmitting areas of the original image are light absorbing areas in the temporary image. The temporary image is retained in the photoconductor-liquid crystal sandwich structure 10 after the switch 22 is returned to its open neutral position and the photoconductive layer 18 is no longer exposed to the original image. This positive-negative relationship is, of course, dependent upon the operation of a particular photoconductor-liquid crystal sandwich structure and is useful for application to the present invention of FIGS. 2–4.

The formation time for forming the temporary image can be controlled by varying the intensity of the light or radiation display of the original image, the time duration during which the switch is closed upon the first terminal 24 or the value of the first d.c. voltage potential applied to the photoconductive-liquid crystal sandwich structure 10. An exposure light intensity of the original image on the order of 1,000 foot-candles, a d.c. voltage source potential of 400 volts, and an image forming time period of 0.5 seconds have been found to be satisfactory.

The temporary image formed in the photoconductor-liquid crystal sandwich structure 10 may be erased by closing switch 22 upon the second terminal 28, thereby applying the second a.c. voltage potential generated by a.c. voltage potential source 26 through the first and second transparent electrodes 12 and 14 and across the photoconductive layer 18 and liquid crystal layer 16. An a.c. voltage potential of 600 volts at a frequency of 1,000 Hz applied for one to two seconds is satisfactory to scatter the orientation of the liquid crystals in liquid crystal layer 16, thereby rendering the liquid crystal layer 16 uniformly and highly transmissive of specular radiation or light.

This operation of the photoconductor-liquid crystal sandwich structure 10 of FIG. 1 is essentially the same as that disclosed in the aforementioned U.S. Application Ser. No. 81,960. The temporary image forming ability of the photoconductor-liquid crystal sandwich structure 10 may be advantageously employed in the color analyzing printer of the present invention, shown in FIGS. 2–4, to produce a positive color representation of pictorial information contained on a photographic color negative. Color imbalances in the positive color representation may be observed by an operator of the color analyzing printer and adjustments may be made of the intensities of the red, blue and green light in the source of printing light until a color balanced positive color representation is observed on the viewing screen. Thereafter, photosensitive photographic color print material may be exposed to the printing light projected through the photographic color negative to print the pictorial information contained on the photographic color negative. Because photographic printing apparatus is well known, the following description of FIGS. 2–4 will be directed, in particular, to elements forming part of, or cooperating more directly with, the present invention, elements or structure not specifically shown or described herein, being understood to be selectable from those known in the art.

Figure 2:
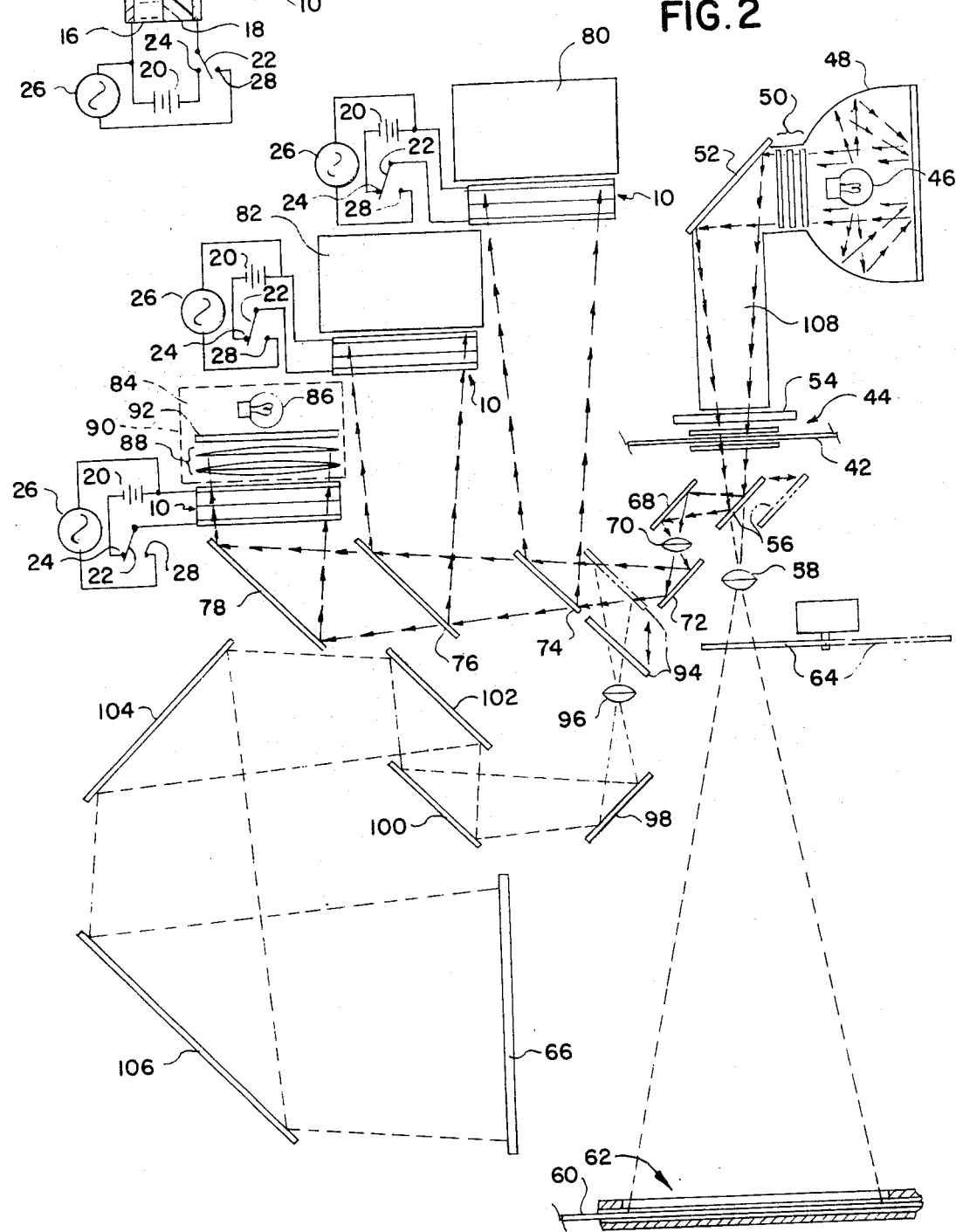
FIG. 2 is a side elevation of a color analyzing printer constructed in accordance with this invention, with parts in section for clarity of illustration, operative in a first mode for forming temporary images of pictorial information contained on a color negative in temporary image forming devices of FIG. 1.

Referring now to FIGS. 2–4 in greater detail, a photographic original such as a color negative 42 is positioned in the projection station 44 which may consist of a negative holder, of the photographic color analyzing printer of the present invention so that radiation, such as light containing the three primary colors, red, blue and green, may be projected through the color negative. The projection light is generated by a projection lamp 46 in a lamphouse 48 and is reflected from the ellipsoidal reflector, then from a cold mirror through a hole at the vertex of the ellipsoidal reflector and passes through a position where two or more sliding filters 50 consisting of multilayer dichroic interference coatings on heat-resistant glass may be introduced partially into the beam to adjust the relative intensities of red, blue and green light emitted by lamp 46 and passing through the adjustable dichroic filter in a manner well known in the prior art of projection color printing and described in greater detail, for example, in the Eastman Kodak publication *The KODAK 26000 Variable Color Lamphouse*, published February, 1971. The adjusted-color radiation is passed into an integrating box 52 through a diffuser 54 to the photographic color negative 42.

The pictorial information on the color negative 42 modulates the red, blue and green light projected therethrough, and the modulated red, blue and green light is reflected, in FIG. 2, by a recording mirror 56 that is movable between the solid line and dotted line positions shown in FIG. 2; when, however, the recording mirror 56 is moved into the position shown in FIG. 4, the modulated red, blue and green light is focused by projection lens 58 onto photosensitive color print material 60 positioned in and movable through a mask assembly constituting the printing station 62. Exposure of the photosensitive color print material to the negative pictorial information on the color negative is terminated by movement of the dark shutter 64 into the printing path 66 of the printing beam, as shown in FIGS. 2 and 3. Exposure of the photosensitive print material 60 may also be terminated by extinguishing projection lamp 46.

With the exception of the movable recording mirror 56, the elements of FIGS. 2–4 hereinbefore described constitute a color printer selectable from those known in the prior art, and further discussion of the operation or characteristics of these elements of such a color printer is considered to be unnecessary.

The remaining elements of FIGS. 2–4 constitute the apparatus for producing a positive color representation of the pictorial information contained on the color negative 42 on a viewing screen 66 for analysis of the color balance of the positive color representation by the operator of the color analyzing printer of the present invention.

Referring to FIG. 2, when the lamp 46 is energized and the recording mirror 56 is located in the position shown, the red, blue and green light projected through and modulated by the photographic color negative 42 is reflected from the mirror 56 onto mirror 68 and is imaged by recording lens 70 onto mirror 72 and thereafter onto color image separation apparatus comprising dichroic color beam-splitters 74 and 76. The dichroic beam-splitter 74 is operative to transmit green and blue light and to reflect red light, whereas the dichroic beam-splitter 76 is operative to transmit green light and to reflect blue light. The reflected red and blue light and the transmitted green light constitute red, green and blue color separation images of the pictorial information on the color negative 42. The red and blue color separation images are directed by the dichroic beam-splitters 74 and 76 and to first and second temporary image forming devices which include the photoconductive-liquid crystal sandwich structures 10 and the associated circuit of FIG. 1. The green color separation image is reflected by mirror 78 onto a third temporary image forming device also comprising the photoconductor-liquid crystal sandwich structure 10 and the associated electrical circuit of FIG. 1.

Associated with the photoconductor-liquid crystal sandwich structures 10 are first, second and third color filtered viewing lamphouses 80, 82 and 84 which each comprise a lamp 86, lens assembly 88, a light tight lamp housing 90 and a color filter 92. The color filters 92 of the first, second and third view lamphouses 80, 82 and 84 transmit only red, blue and green light, respectively, emitted by the lamps 86. For simplicity of illustration, only the viewing lamphouse 84 is completely illustrated.

A viewing mirror 94 is movable between the solid and dotted line positions shown in FIGS. 2–4. When the viewing mirror is in the position shown by the solid line in FIG. 3, light redirected in a manner to be described hereinafter from the surface of the dichroic beam-splitter 74 is focused and projected by view lens 96 onto the successive mirrors 98, 100, 102, 104 and 106. The mirror 106 reflects the light onto viewing screen 66. The viewing lens 96 and the mirrors 98 to 106 cooperate to magnify the pictorial information on the negative photographic original 42 to approximately the same magnification on the viewing screen 66 as the pictorial information is magnified by the projection lens 58 onto the photosensitive color print material 60. Therefore, the positive color representation on the viewing screen 66 is of the same size as the photographic print produced on the photosensitive photographic color print material 60. It will be understood, although it is not specifically shown, that the viewing lens 96 may constitute more than a single lens element and is provided with a variable aperture, so that the viewing lens 96 may be stopped down from maximum aperture to lower the brightness of the positive color representation produced on the viewing screen 66.

It will also be understood that the projection lens 58 may constitute more than a single lens element and is provided with a variable aperture similar to that of viewing lens 96. The aperture stops of the viewing lens 96 and the projection lens 58 may be correlated to specific printing times by the initial display and printing of a standard color negative through the operation set forth below until, as a result of the achievement of the proper filtration, corresponding viewing and printing apertures and printing time, the resulting positive color representation and the resulting print closely match a standard print supplied with the standard color negative. The resulting printing time for the standard color negative may be correlated to the apertures of the viewing lens 96 and projection lens 58 that produce acceptable positive color representations and prints, respectively. Other aperture stops may then be correlated to corresponding printing times according to the well known relationship that on increase or decrease of lens aperture by one aperture stop corresponds to halving or doubling respectively, the exposure time.

Turning now to the operation of the novel color analyzing printer, in FIG. 2, the photographic color negative 42 is placed or advanced into the printing station 44 so that the pictorial information or other original image in a negative frame thereon is centered in the projection station 44. The adjustable dichroic filters so are left in the beam from a previous negative analysis. The recording mirror 56, the viewing mirror 94 and the dark shutter 64 are moved into the solid line position shown in FIG. 2 and the switches 22 of the temporary image forming devices are closed upon the first terminals 24, so that the first, d.c., voltage potential from the d.c. voltage source 20 is applied across the photoconductor-liquid crystal sandwich structures 10 in a manner described hereinbefore with respect to FIG. 1.

Thereafter, the projection lamp 46 is energized and red, blue and green light from the projection lamp 46 is projected in the path of the arrows 108 through the photographic color negative 42, and the red, blue and green light modulated by the pictorial information on the color negative 42 is reflected by record mirror 56 and mirror 68, projected by recording lens 70, reflected by mirror 72, and separated and reflected by dichroic beam-splitters 74 and 76 and mirror 78 onto the respective temporary image forming devices. As described hereinbefore, the dichroic beam-splitter 74 and 76 separate the projection light modulated by the pictorial information on the photographic color negative 42 into negative red, blue and green color separation images which are directed upon the first, second and third temporary image forming devices. The photoconductive layers 16 of the photoconductor-liquid crystal sandwich structures 10 respond to the respective negative red, blue and green color separation images to become selectively conductive in the manner described with respect to FIG. 1. Because the first, d.c., voltage potential is applied across the photoconductor-liquid crystal sandwich structures 10, the liquid crystal layers 18 respond electro-optically to the selectively conductive areas of the photoconductive layer 16 to form positive red, blue and green color separation images of the respective negative color separation images directed thereon. After a time period specified in the description of FIG. 1, the switches 22 are moved into the open neutral position. The positive red, blue and green color separation images are therefore stored on the respective first, second and third electro-optical temporary image forming devices.

The positive color representation of the pictorial information contained on the color negative 42 is produced by the color analyzing printer in the manner depicted in FIG. 3. The viewing mirror 94 is moved from the position shown in solid lines in FIG. 2 to the position shown in solid lines in FIG. 3. Thereafter, the lamps 86 of the viewing lamphouses 80, 82 and 84 are energized and specular red, blue and green light is transmitted through the respective positive temporary images stored on the respective first, second and third electro-optical temporary image forming devices. The mirror 78 and the color separating dichroic beam-splitters 76 and 74 respond to the red, blue and green light projected through the respective positive temporary images stored in the respective temporary image forming devices to superimpose the positive red, blue and green color separation beams onto the viewing mirror 94; and the viewing lens 96 focuses the superimposed positive color image by means of the mirrors 98–106 onto the viewing screen 66. Therefore, a positive color representation of the pictorial information contained on the color negative 42 is produced on the viewing screen 66.

The operator of the color analyzing printer observes any color imbalances appearing in the positive color representation of the viewing screen 66 and computes an adjustment of the sliding dichroic filters 50 to vary the relative intensities of the red, blue and green light projected through the color negative 42 to compensate for color imbalances observed in the positive color representation. Alternatively, the operator's mental corrections may be accomplished by the apparatus described in U.S. Pat. No. 3,161,108, entitled PHOTOGRAPHIC COLOR REPRODUCTION APPARATUS, that senses the proportions of red, green and blue light in a projected image of a photographic original and automatically adjusts the color filters in the printer's projection lamphouse to compensate for detected color imbalances. The analyzing color printer of the present invention could employ such apparatus to make the adjustments to the position of the dichroic filters 50 from the positive color representation on viewing screen 66.

Thereafter, if a change in the position of the dichroic filters 50 is in order, the lamps 86 are turned off. The change is made by either of the two methods described in the preceding paragraph, and the temporarily stored color separation images are erased from the electro-optical, photoconductor-liquid crystal sandwich structures 10 by closure of the switches 22 upon the second terminals 26, so that the second, a.c., voltage potential is applied from a.c. voltage source 26 across the photoconductor-liquid crystal sandwich structures 10 to erase the stored images. The operator follows the steps set forth in the description of the operation of FIG. 2 to produce a further positive color representation of the pictorial information contained on the color negative 42. The operator continues to follow the steps associated with the description of FIGS. 2 and 3 until a pleasing, color balanced, positive color representation of the pictorial information is observed on the viewing screen 66. At any time, the brightness of the positive color representation may be changed by adjusting the diaphram in the viewing lens 96.

A time period of only about one second is required for the erasure and reformation of a color separation image in the respective temporary image forming devices. An experienced operator may mentally calculate changes to the position of the dichroic filters 50 to further reduce balancing time.

When the color balance and brightness of the positive color representation is satisfactory, the specular viewing lamphouses 80, 82 and 84 are extinguished. The color separation images formed in the respective temporary image forming devices are erased by closure of the switches 22 upon the second terminals 28 in the manner described hereinbefore, and the recording mirror 56 is moved from the solid line position shown in FIGS. 2 and 3 to the solid line position shown in FIG. 4. The aperture stop of projection lens 58 is set to that of viewing lens 96, the projection lamp 46 is energized and the dark shutter 64 is moved out of the path 66 of the projection beam so that the red, blue and green light passing through the adjusted dichroic filters 50 in the projection path 108 is projected through the color negative 42 and focused by the printing lens 58 onto the photosensitive color print material 60 so that a print of the pictorial information or other original image carried by the color negative may be reproduced. The duration of the exposure of the photosensitive color print material 60 may be determined from the aperture stop of the viewing lens 96 as described hereinbefore, and the dark shutter 64 is inserted into the printing beam to terminate exposure after the printing time has elapsed.

In view of the fact that the photosensitive color print material 60 may differ in photosensitivity to certain colors, and since the differing sensitives would not be observable on the viewing screen 66, it may be desirable to insert a compensating filter pack (not shown) into the projection path between the viewing lens 96 and the viewing screen 66. Other factors in photographic printing may be employed to compensate for imbalances in the spectral emissions of the projection lamp 46 and viewing lamps 86, for unwanted spectral absorptions of the dichroic beam-splitters 74 and 76 and the filters employed in the color analyzing printer, and for any varying spectral sensitives of the photoconductive layers 16 of the photoconductor-liquid crystal sandwich structures 10.

To summarize, applicant has shown a novel method and apparatus for producing a positive color representation of pictorial information contained on a photographic color negative, for analyzing and correcting for color imbalances in the positive color representations, and for projecting the pictorial information or other original image on the photographic color negative on photosensitive material with compensation for the observed color imbalances.

The invention has been described in detail with particular reference to preferred embodiments thereof but it will be understood that variations and modifications can be effected within the spirit and scope of the invention.

I claim:

1. A method of producing a visual representation in first and second wavelengths of radiation of an original image contained on a photographic original, said method comprising the steps of:
   a. positioning a photographic original containing an original image in first and second wavelengths of radiation in a projection station;
   b. projecting first and second wavelengths of radiation through said photographic original positioned in said projection station;
   c. separating the first and second wavelengths of radiation projected through said photographic original into first and second wavelength separation images of the original image on said photographic original;
   d. directing said first and second wavelength separation images onto first and second respective electro-optical image forming devices comprising photoconductor-liquid crystal sandwich structures, and simultaneously applying first voltage potential across said photoconductor-liquid crystal sandwich structures, whereby first and second wavelength images of said first and second wavelength separation images are formed and stored in said first and second electro-optical image forming devices; and
   e. illuminating said stored first and second wavelength images with the first and second wavelengths of radiation, respectively, and projecting said temporarily stored first and second wavelength images in mutual superimposition onto a viewing screen, whereby a representation in first and second wavelengths of radiation of the original image on said photographic original is produced on said viewing screen.

2. Apparatus for producing a visual representation in first and second wavelengths of radiation of an original image contained on a photographic original, said apparatus comprising:
   a. means for positioning a photographic original containing an original image in first and second wavelengths of radiation in a projection station;
   b. means for projecting first and second wavelengths of radiation through said photographic original positioned in said projection station;
   c. means for separating the first and second wavelengths of radiation projected through said photographic original into first and second wavelength separation images of the original image on said photographic original;
   d. means for directing said first and second wavelength separation images onto first and second respective electro-optical image forming devices comprising photoconductor-liquid crystal sandwich structures, and for simultaneously applying a first voltage potential across said photoconductor-liquid crystal sandwich structures whereby first and second wavelength images of said first and second wavelength separation images are formed and stored in said first and second electro-optical image forming devices; and
   e. means for illuminating said stored first and second wavelength images with the first and second wavelengths of radiation, respectively, and for projecting said stored first and second wavelength images in mutual superimposition onto a viewing screen, whereby a visual representation in first and second wavelengths of radiation of the original image on said photographic original is produced on said viewing screen.

3. A method of producing a positive color representation of pictorial information contained on a photographic color negative, said method comprising the steps of:
   a. positioning a photographic color negative containing pictorial information in a projection station;
   b. projecting light containing the three primary colors, red, green and blue through said photographic color negative positioned in said projection station;
   c. separating the red, green and blue light projected through said photographic color negative into negative red, green and blue color separation images of the pictorial information on said photographic color negative;
   d. directing the negative red, green and blue color separation images onto first, second and third respective electro-optical image forming devices comprising photoconductor-liquid crystal sandwich structures, and simultaneously applying a first voltage potential across said photoconductor-liquid crystal sandwich structures whereby said photoconductor-liquid crystal sandwich structures form and store positive red, green and blue color images of said negative red, green and blue color separation images respectively, upon removal of the first voltage potential; and
   e. projecting specular light containing the three primay colors, red, green and blue, through said stored positive red, green and blue color images in mutual superimposition onto a viewing screen, whereby a positive color representation of the pictorial information on said photographic color negative is produced on said viewing screen.

4. A method of claim 3 comprising the additional step of applying a second voltage potential across said photoconductor-liquid crystal sandwich structures to erase said stored positive red, green and blue color images.

5. Apparatus for producing a positive color representation of pictorial information contained on a photographic color negative, said apparatus comprising:
   a. means for positioning a photographic color negative containing pictorial information in a projection station;
   b. means for projecting light containing the three primary colors, red, green and blue, through said photographic color negative positioned in said projection station;
   c. means for separating the red, green and blue light projected through said photographic color negative into negative red, green and blue color separation images of the pictorial information on said photographic color negative;
   d. means for directing said red, green and blue color separation images onto first, second and third respective electro-optical image forming devices comprising photoconductor-liquid crystal sandwich structures, and for simultaneously applying a first voltage potential across said photoconductor-liquid crystal sandwich structures, whereby said first, second and third photoconductor-liquid crystal sandwich structures form and store positive red, green and blue color images, respectively, of said negative red, green and blue color separation images, respectively upon removal of the first voltage potential; and
   e. means for specularly illuminating said stored positive red, green and blue color images with red, green and blue light, respectively, and projecting said stored positive red, green and blue color images in mutual superimposition onto a viewing screen, whereby a positive color representation of the pictorial information on said photographic color negative is produced on said viewing screen.

6. The apparatus of claim 5 further comprising means for applying a second voltage potential across said first, second and third photoconductor-liquid crystal sandwich structures to erase said stored positive red, green and blue color images.

7. A method of printing an original image on a photographic original, said method comprising the steps of:
   a. positioning a photographic original containing an original image in said first and second wavelengths of radiation in a projection station;
   b. projecting first and second wavelengths of radiation through said photographic original positioned in said projection station;
   c. separating the first and second wavelengths of radiation projected through said photographic original into first and second wavelength separation images of the original images on said photographic original;
   d. forming and temporarily storing first and second wavelength images of said first and second wavelength separation images of the original image;
   e. illuminating said temporarily stored first and second wavelength reverse images with first and second wavelengths of radiation, respectively, and projecting in mutual superimposition said first and second wavelength images onto a viewing screen;
   f. adjusting the relative intensities of the first and second wavelengths of radiation projected through said photographic original to compensate for observed imbalances in intensities of the first and second wavelengths of radiation in the image on said viewing screen;
   g. erasing said temporarily stored first and second wavelengths reverse images;
   h. retracing steps (b) to (g) until the image of the original image on said photographic original displayed on said viewing screen is balanced in first and second wavelengths of radiation; and
   i. directing the first and second wavelengths of radiation projected through the photographic original onto photosensitive color print material, whereby the original image on said photographic original is printed.

8. A method of printing pictorial information on a photographic color negative, said method comprising the steps of:
   a. positioning a photographic color negative containing pictorial information in a projection station;
   b. projecting light containing three primary colors, red, green and blue through said photographic color negative positioned in said projection station;
   c. separating the red, green and blue light projected through the photographic color negative into red, green and blue color separation images of the pictorial information on said photographic color negative;
   d. directing the red, blue and green color separation images onto first, second and third respective electro-optical image forming devices comprising photoconductor-liquid crystal sandwich structures, and simultaneously applying a first voltage potential across said photoconductor-liquid crystal sandwich structures, whereby said photoconductor-liquid crystal sandwich structures form and temporarily store positive red, green and blue color images of said red, green and blue color separation images;
   e. projecting light containing the three primary colors, red, green and blue, through said temporarily stored positive red, green and blue color images in mutual superimposition onto a viewing screen, whereby a positive color representation of the pictorial information on said photographic color negative is produced on said viewing screen;
   f. detecting imbalances in the relative intensities of the red, green and blue colors in the positive color representation on said viewing screen;
   g. adjusting the intensities of the red, green and blue light projected through said photographic color negative to compensate for any detected imbalances in the red, green and blue colors of the positive color representation on said viewing screen;
   h. applying a second voltage potential across said photoconductor-liquid crystal sandwich structures to erase the temporarily stored red, green and blue color positive images;
   i. retracing steps (b) to (h) until color imbalances in the positive color representation on said viewing screen are no longer detected; and
   j. directing the light projected through the photographic color negative in step (b) onto photosensitive photographic color print material, whereby the pictorial information on said photographic color negative is printed.

9. In a photographic color printer comprising a projection station for receiving a photographic color negative containing pictorial information to be printed, a projection lamphouse including a source of light containing the three primary colors, red, green and blue, means for projecting the light from the lamphouse through a photographic color negative position in said projection station, and two or more adjustable dichroic filters to vary the relative intensity of the red, green and blue light projected through said photographic color negative, a printing station for receiving photosensitive color print material, and a printing lens for directing the light projecting through said photographic color negative onto said photosensitive color print material, whereby the pictorial information on said color negative is printed; apparatus for producing a positive color representation of the pictorial information contained on said color negative, said apparatus comprising:

a. means located with respect to said projection station for separating the red, green and blue light projected through said color negative into negative red, green and blue color separation images of the pictorial information on said color negative;

b. means for directing said negative red, green and blue color separation images onto first, second and third respective electro-optical image forming devices comprising photoconductor-liquid crystal sandwich structures, and for simultaneously applying a first voltage potential across said photoconductor-liquid crystal sandwich structures, whereby said first, second and third photoconductor-liquid crystal sandwich structures form and temporarily store positive color separation images, respectively, of said negative red, green and blue color separation images, respectively, after removal of said first voltage potential; and c. means for specularly illuminating said temporarily stored positive color separation images with red, green and blue light, respectively, and for projecting said stored positive color separation images in mutual superimposition onto a viewing screen, whereby a positive color representation of the pictorial information on said color negative is produced on said viewing screen, and said dichroic filters may be adjusted to vary the relative intensities of the red, green and blue light projected through said photographic color negative to compensate for color imbalances in the positive color representation produced on said viewing screen.

10. In the photographic color printer of claim 9, the further improvement comprising means for applying a second voltage potential across said photoconductor-liquid crystal sandwich structures to erase said temporarily stored positive color separation images.

* * * * *